United States Patent [19]
Perrone

[11] Patent Number: 4,842,561
[45] Date of Patent: Jun. 27, 1989

[54] AQUATIC VEHICLE

[76] Inventor: Carlos J. Perrone, Azcuenaga 1233, Buenos Aires, Argentina, 1115

[21] Appl. No.: 113,875

[22] Filed: Oct. 27, 1987

[30] Foreign Application Priority Data

Apr. 15, 1987 [AR] Argentina ............... 307300

[51] Int. Cl.⁴ ............................................. B63H 1/32
[52] U.S. Cl. ................................ 440/100; 114/270; 152/328
[58] Field of Search ................. 440/98–100, 440/45; 114/270, 271, 272, 284, 67 R, 344; 152/328, 329

[56] References Cited

U.S. PATENT DOCUMENTS

| | | | |
|---|---|---|---|
| 1,924,949 | 8/1933 | Lombardini | 440/100 |
| 1,964,452 | 6/1934 | Cisheros | 440/100 |
| 2,309,875 | 2/1943 | Thompson | 440/100 |
| 3,298,348 | 1/1967 | Sanders | 440/100 |

FOREIGN PATENT DOCUMENTS

| | | | |
|---|---|---|---|
| 0668880 | 6/1979 | U.S.S.R. | 114/270 |
| 251869 | 5/1926 | United Kingdom | 440/100 |

*Primary Examiner*—Sherman D. Basinger
*Assistant Examiner*—Edwin L. Swinehart
*Attorney, Agent, or Firm*—Darby & Darby

[57] ABSTRACT

An aquatic vehicle for transporting passengers at high speeds over water, the vehicle having an elongated body with an enclosed cabin for accommodating passengers, wheels for sustaining the body above water, axles projecting from the body to the wheels, inflated tires with oval cross-sections, partitions extending in the tires radially outward from the axles so as to form hermetically sealed and watertight chambers to maintain floatability even after a portion of the tires becomes damaged, and a turbine for propelling the body on the surface of the water. The wheels are freely rotatable and free of any transmission means from the turbine.

14 Claims, 7 Drawing Sheets

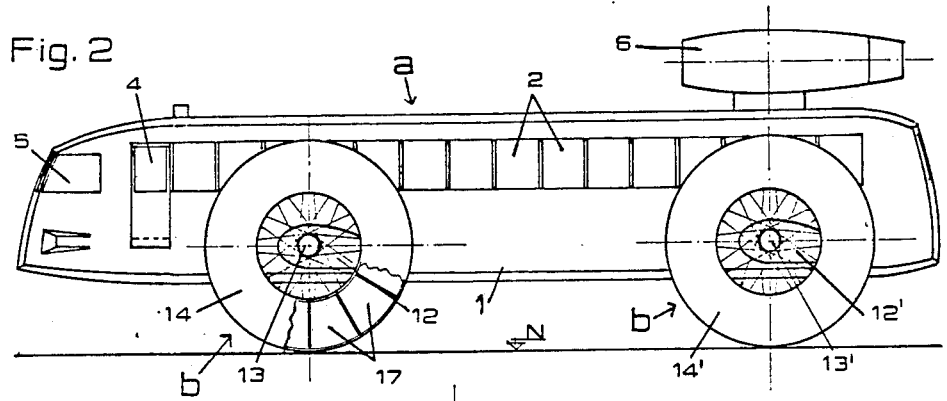
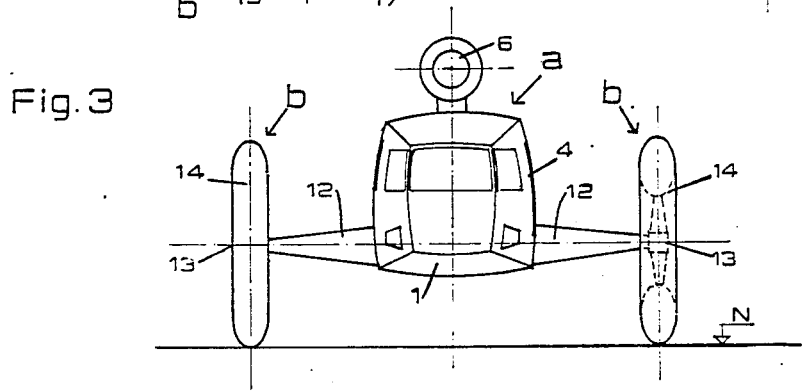
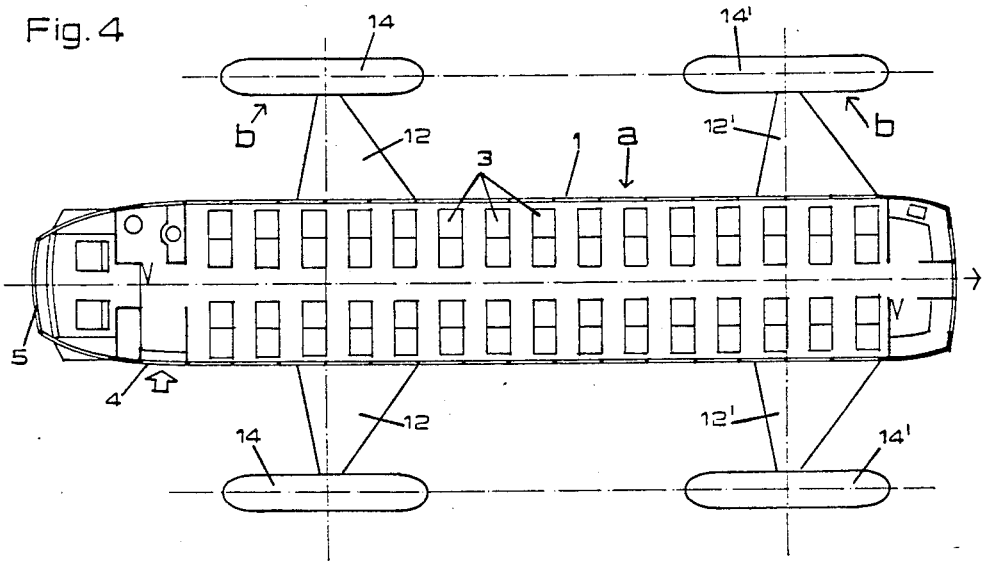

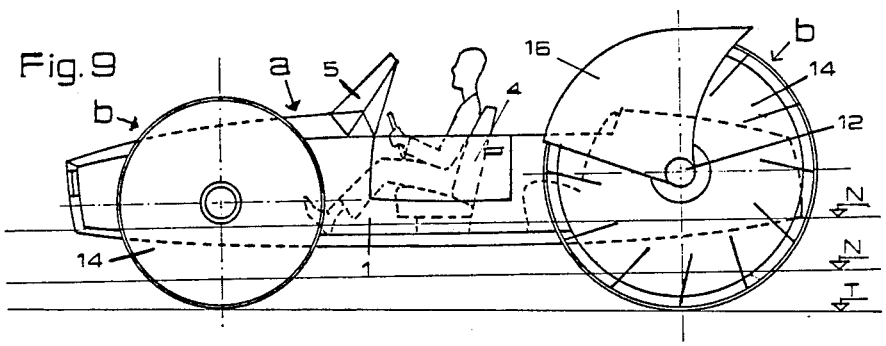
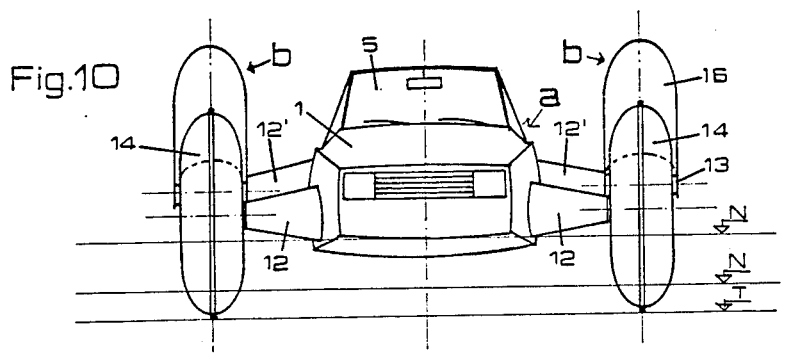
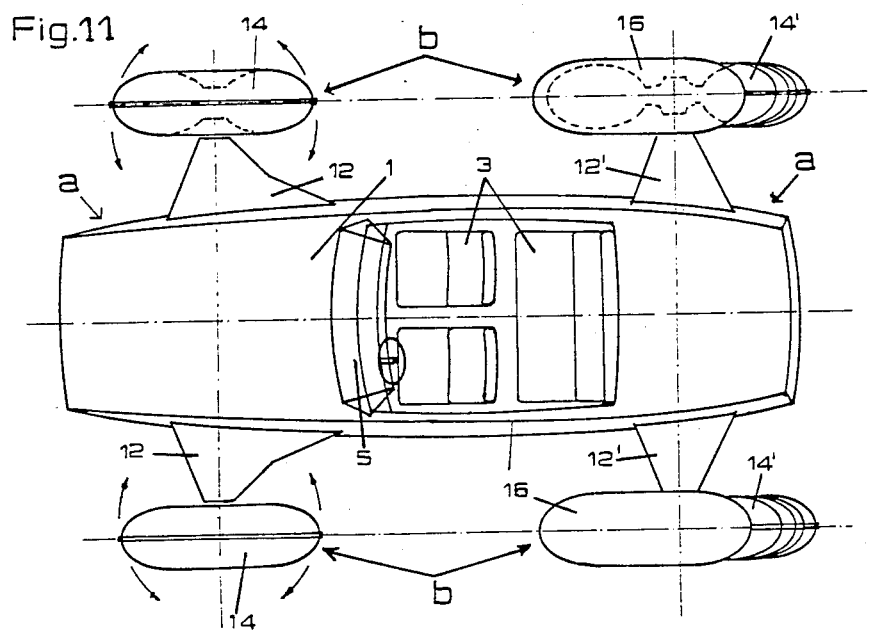

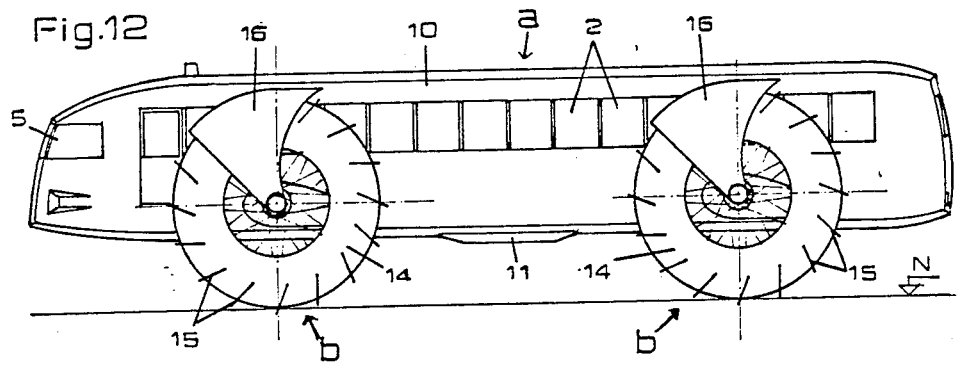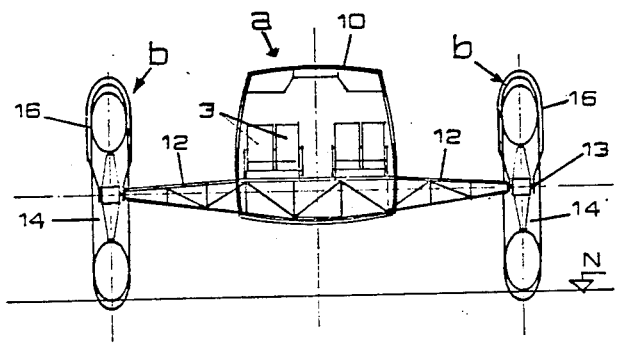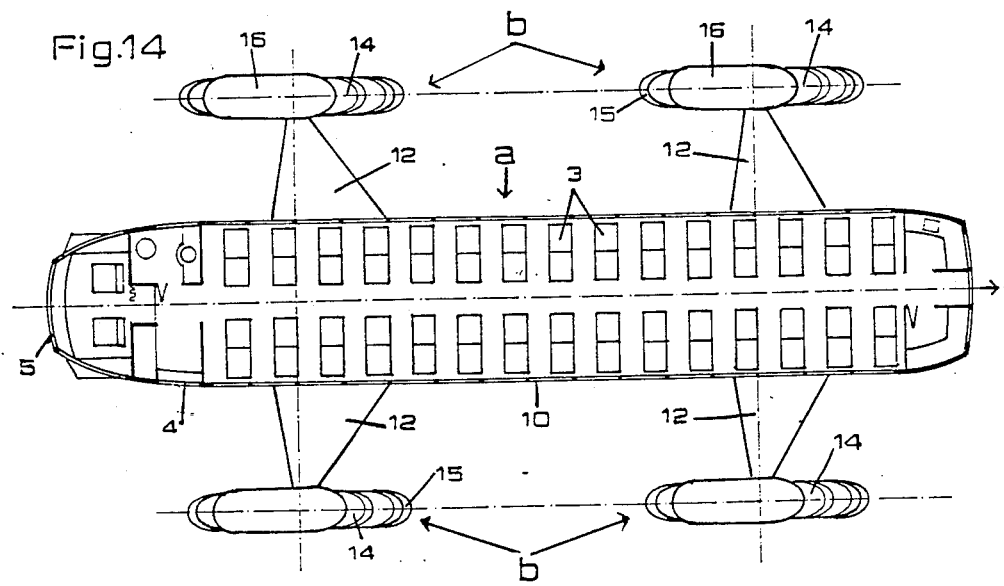

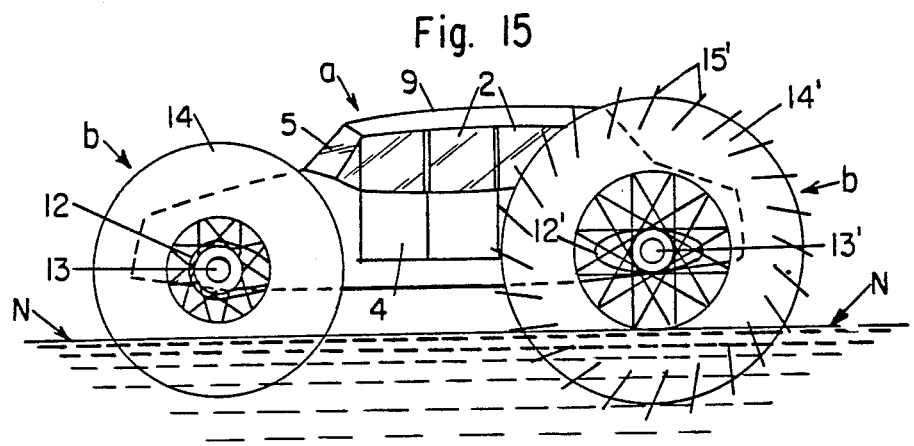
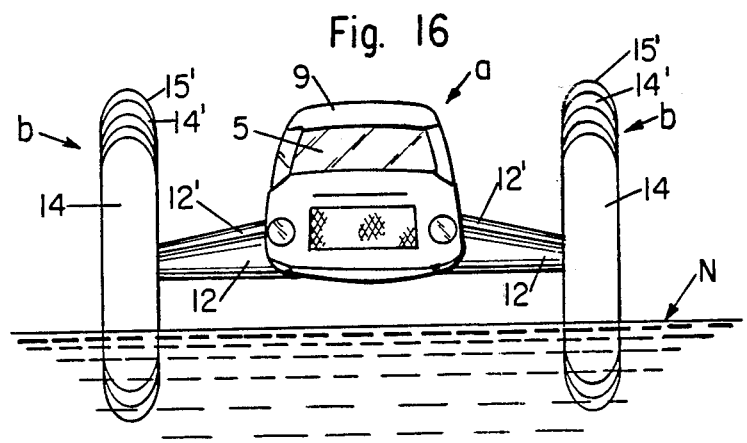
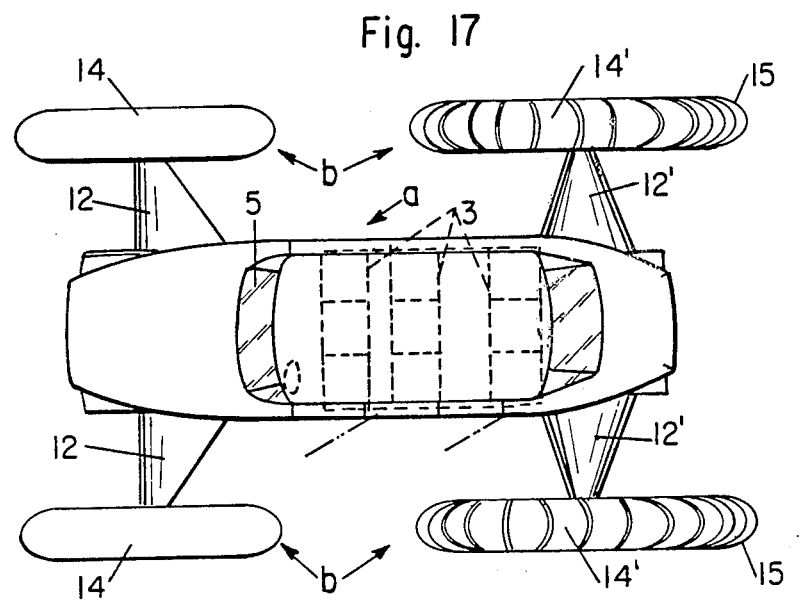

AQUATIC VEHICLE

BACKGROUND OF THE INVENTION

Present invention refers to a new aquatic vehicle and specifically to a very novel revolutionary hydromobile vehicle that allows for high speeds by sliding on a liquid medium.

As is notoriously and widely known, the displacement of any kind of ship along a liquid medium demands great effort due to the very high resistance put up by water to the advance of the hull at its beam, the resistance is directly proportional to the speed. If the speed is minimum, so is then resistance, but if the speed of the vehicle increases, so does such resistance which also depends on the surface in contact, on the shape of the hull (at least in the inmersed area), etc.

It can be said that when the speed of aquatic vehicles increases the resistance of water increases geometrically. Thus water becomes an unsurmountable obstacle when a certain speed limit is reached, and from that limit the water mass sometimes "rejects" the introduction of any body in motion when this speed exceeds that of maximum displacement of the molecules corresponding to the liquid medium.

In this case water becomes a "hard" surface as to speed. There are many and very known examples which can support the preceding theory.

Thus, when we drop a little flat stone into the water (that is to say, with the only speed of the gravitational attraction), it will simply go into the liquid medium and it will sink in it. However, if we throw the same stone with strength angularly from a level close to the surface of the liquid medium, it will, due to the higher speed and surface tension, repeatedly rebound before sinking when it loses speed. Another example which is widely known is that of the water skis. The higher the traction speed (which may reach 60 k/p/h), the more firmly the skis lean on the water surface, thus raising the skier out of the water. However, as soon as the speed diminishes, the consequent sinking occurs and as the skis sink - due to the speed diminution - the resistance between the water and the surface in contact with them increases.

Since water resistance, which increases at a rate of the drive by speed squared, is the main cause for preventing a ship's hull from displacing at high speed along a liquid medium, the fastest ships do not exceed 100 kph and demand great driving force or motor power.

This invariably implies high operative costs, considerable wear and tear, need of complicated hydrodynamic hull designs and basically excessive fuel consumption.

Limitations imposed by transported people and/or goods safety should also be considered. It must be taken into account that the variation of the vehicle center of gravity due to a subsequent variation in the flotation line, thus increasing dangerously the upperworks height, restricting the use of this kind of vehicle for sporting competitions (as in the case of racing boats).

In the case of water skating transportation vehicles the solution to the proposed problems has been studied based on the rigid support of shoes or "skis" which, placed towards the bow of ships or big launches for the transportation of passengers and cargo, have a back drive in the area where the hull rests and cause a big increase in speed. Thus, the skis "rest" on the front area of the hull in the water, in the stern area.

Due to the height increase in the upperworks, the variation of the center of gravity (which is then located at a higher point) and the relative "rigidity" granted by water at such speed so as to serve as support, possible speeds higher than the regular one in other aquatic vehicles with the same displacement are rendered, yet limited to certain speeds (for example between 50 to 70 k/p/h) added to excessive fuel consumption which is added to the operative costs thus affecting the economics of the system.

SUMMARY OF THE INVENTION

The essential characteristic of the invention is that the vehicle hull rests on set of floating wheels which have the particular feature of being assembled in a "free wheel" or freely revolving manner in relation with the lateral axles located in the hull area of the main cabin while an external propellent means (normally not traction wheels) causes the forward movement of the vehicle along the liquid medium.

As said wheels are eminently floating (conforming water tight chambers) they provide sufficient support to the vehicle, thus increasing floatability condition of the main cabin. They also serve as safety devices (as rotary floats) which help to prevent possible accidents, leaks or openings in the main cabin or hull of the vehicle by keeping said vehicle floating. The most important feature to be considered is that said wheels, apart from being floating -again mentioned due to its importance - are assembled on their corresponding axles in a free wheel style or freely rotating manner. Therefore, they do not offer great resistance to water and said resistance is minimum and diminishes as vehicle speed increases, opposite to what happens to ship hulls: the higher the speed. The more resistance diminishes as the small hull area in contact with the water starts "taking off" until it remains over the surface or at a minimum contact, The "free wheels" or freely rotary assembly of the wheels does not "make way for itself" in a forced manner through the liquid medium, frictioning it as in the case of ship hulls rather, the vehicle "runs" on it without friction, pushing the liquid medium downwards and joining water mass displacement direction.

This effect is increased by means of the traction vanes in the peripheral area of at least the back set of said wheels and is complemented with aerodynamic covers located in the upper part of said wheels. It must be taken into account that said wheels are of relatively big dimensions and emerge in a big proportion. Therefore, exposed out of the water, vanes may be a "braking" factor, unless they are covered with aerodynamic walls.

Since long ago ships have been known to have "wheels" in their hulls, but such conventional wheels are essentially different in that they are propellent wheels in all cases (while in this invention they are "free wheels" or freely rotary assembled). Therefore, prior art conventional wheels only rotate in reply to the thrust action of the propelling medium with which they are operatively connected and thus they force the water mass to displace its molecules at the same speed so as to allow the forward movement; however, in the case of this new invention, wheels rotate freely and, far from being another resistance factor, they operate as rotary supports which yield to less liquid medium resistance and contribute to displacement with the least effort.

That is to say that in the case of conventional aquatic ships "with wheels", the wheels which are not eminently floating are the propellent means and the vehicle moves at the maximum speed allowed by said wheels, being the same another resistance to displacement structural medium due to its shape. To the contrary, in the case of this invention, the propellent means is in dependent of the wheels and these contribute to displacement as they constitute mobile hull supports with minimum or no hull penetration in the liquid mass - after reaching certain speeds-and become subordinated to the molecular displacement of the medium which they accompany and to which they correspond according to the required rotation. Therefore, as an example, when a vehicle reaches a certain speed - about 200 k/p/h - water refuses to be penetrated by the wheels and the same rotate touching lightly its surfce or on the crest of small waves. As regards penetration in the air, as the apparatus shows a big volume which stands out on the water level (in nautics known as the ship upperworks) resistance of such air mass is of a great incidence as the vehicle reaches very high speeds, such that it may absorb a very important proportion of the driving power. There is no remarkable difference if we compare it with an airplane of equivalent displacement because the front of the main cabin of the new hydromobile vehicle is the same as the front of the airplane fuselage, while the fronts of wheels and their support vanes are not bigger than the front parts of the wings, yet airplanes can reach 700 k/p/h.

Following the same comparison, while an airplane needs power for its advance and sustenance in the air, this hydromobile vehicle requires power for its advance and for absorbing the mechanical friction of the turning of its wheels that can exceed 500 revolutions per minute when the vehicle runs at high speed.

Finally, and as regards the hydromobile vehicle, airplanes have the advantage of less air resistance which, when at a height of 7000 metres, can be of about half the resistance at ground level. On the other hand, airplanes require landing gears -which constitute a big dead weight- and a several times bigger fuel load - because of cruising range reasons - in comparison with only about three cubic meters of fuel required by the new aquatic vehicle for relatively short distances. Thus, taking into account the weight-power relation, air-resistance to both media does not basically differ.

Another distinct feature on prior art is the fact that being freely rotary wheels, which provide for an easier displacement of the vehicle, they are, as beforementioned, auxiliary floating means which support the main cabin, having the characteristic that chambers that make up same, are divided by radial or otherwise directed partitions into elemental watertight chambers. Thus, in case of breakage when, for example, a wheel hits a hard object such as a sunken ship, log, boat or any other hard object, one or more independent chambers may, undoubtedly, be affected, without causing damage to the other chambers which remain in floating conditions because they can only sink by means of the simultaneous destruction and puncture of all elemental chambers (this assumption is practically improbable). Taking into account that the vehicle has four big wheels or more, it acquires the characteristic of "Unsinkable" which constitutes another safety factor for transportation of passengers and goods even in bad weather conditions such as tempests, winds, storms, etc.

The new vehicle is driven by means of one or more turbines, independently carrying an outboard motor or a similar one at the front, that is used for docking, operations that require slow speed. This auxiliary motor is necessary as a safety autopropellent means in case any emergency, such as stoppage or damage of the principal turbine or turbines, occurs.

Therefore, there is little doubt about the acceptance the new aquatic vehicle will have in practice - whatever the category it may take or the use it may have, as, due to its distinct feature it may be used as a means of transportation for passengers, for cargo, for passengers and cargo, as sporting vehicle or as an aquatic entertaining vehicle, either in rivers, lagoons, lakes or seas, etc.

MAIN OBJECT

According to the aforesaid, the new aquatic vehicle is of the type that includes a main cabin (a) which constitutes a floating hull (1) including propellent means (6), seats (3), compartments and other facilities for passengers and or cargo.

The distinct feature of the new aquatic vehicle is the hull (1) held by sets of floating wheels (b), composed by at least sets of front wheels (14) and sets of back wheels (14'), each wheel (b) assembled in a freely rotative manner with respect to corresponding axles (12 and 12') projected from the main hull (1) of the main cabin (a), and composed by a rigid tyre in which a pneumatic chamber is assembled (14 or 14') internally divided by partitions into elemental pneumatic chambers (17) and each watertight in themselves, the treading surface and adjacencies of, at least the back wheels (14'), have traction vanes (15) while on the upper part said wheels (14') rotate within a rigid aerodynamic covering (16) which acts as a windshield.

BRIEF DESCRIPTION OF DRAWINGS

In order to clearly understand the object of the invention, the same is hereinafter illustrated by means of different figures in some of the preferred ways of putting it into practice. The illustrations are made for infromation purposes and are not restrictive, being:

FIG. 2: a side view of the vehicle in FIG. 1, with a partial section of one of its wheels to show the divisions of the general pneumatic chamber into elemental chambers.

FIG. 3: an elevational front view of the vehicle of FIGS. 1 and 2 where the proportional ratio between the big size floating and freely rotary wheels with respect to the size of the cabin itself can be observed and where the slightly submerged position of the cabin in the liquid medium is indicated, when the former is stopped or when it travels at slow speeds.

FIG. 4: a sectional horizontal longitudinal schematic plan view of the vehicle of FIGS. 1 and 2 showing, as an example, a possible distribution of the seats of passengers and drivers in said vehicle.

FIG. 9: a side view of the vehicle similar to that appearing in FIGS. 1 to 4, floating with a hull displacement separation as regards the water surface when reaching high speeds.

FIG. 10: a front view of the vehicle according to FIG. 9 showing the hull "separated" from the water.

FIG. 11: a plan view of the vehicle according to FIGS. 9 and 10.

FIG. 12: a side view of the vehicle, in a new simplified embodiment, for an inferior number of passengers and/or cargo, with wheels of unequal sizes, wherein the peripheric area of back wheels, projected vanes used as traction supports of wheels can be observed.

FIG. 13: an elevational front view of the vehicle, floating on the water, according to FIG. 12.

FIG. 14: a plant view of the vehicle according to FIGS. 12 and 13.

FIG. 15: a side view of a big size passenger vehicle provided with big side wheels with projected traction vanes rotatively operating through a cavity in its upper prt formed by a protective aerodynamic covering of each wheel having this vehicle a lower auxiliary drive engine.

FIG. 16: a sectional transversal vertical view of vehicle of FIG. 15, and finally FIG. 17: a plan schematic sectional horizontal longitudinal view of the aquatic vehicle in FIGS. 15 and 16. In the different drawings, the same reference numbers indicate the identical or corresponding parts having indicated in small letters the various groups of elements.

Figure 1:
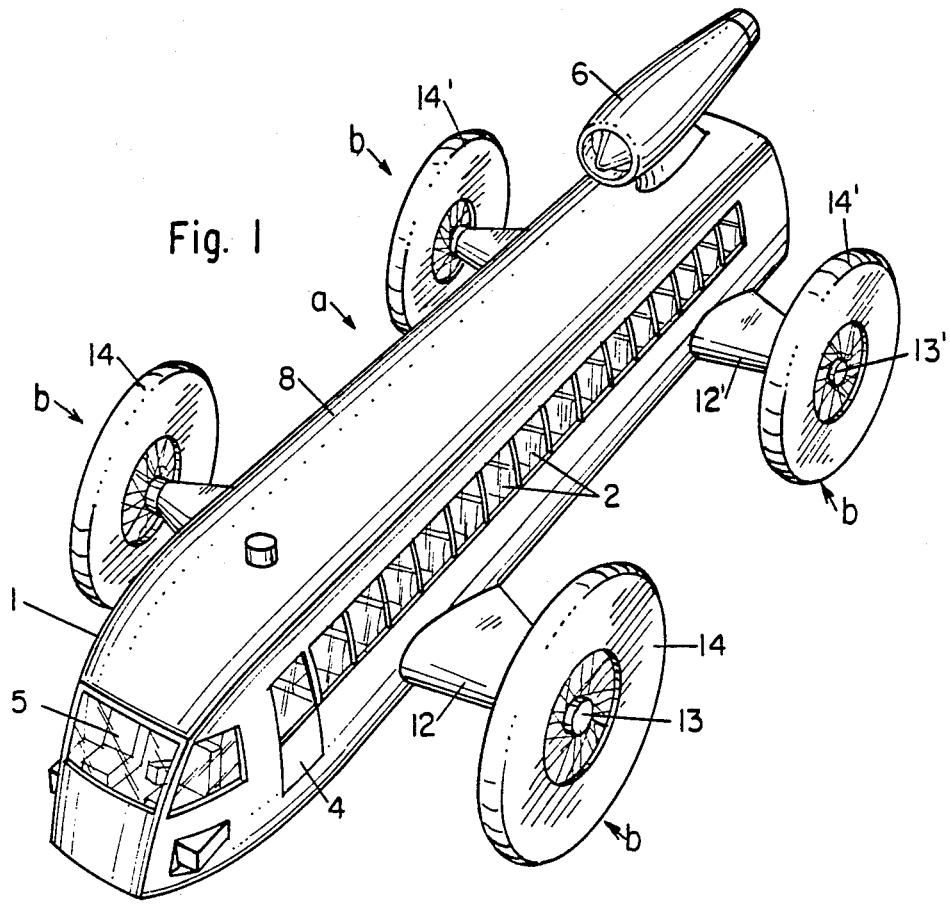
FIG. 1: a perspective view of one of the aquatic vehicles made according to the new invention, composed by the floating wheels that are the main cabin support (designed in this case for passenger transportation), with the corresponding windows, doors, front windscreen, etc. as well as a propeller turbine placed at the upper-back part of the main cabin.

Said references correspond to the following description:

N: Water or liquid medium surface level
N-1,N-2,N-3 and N-4: Position of wheel penetration (b) into the liquid medium according to the speed reached by the vehicle
T: Ground level
1: Floating hull of the main cabin or walls of same (FIGS. 1 to 4)
2: Side windows of a
3: Seats
4: Doors
5: Windshield in driver's cabin
6: Propellent means or turbine
7: Floating hull or walls of the main cabin (FIGS. 5 to 7)
8: Hull and walls of main cabin a corresponding to FIGS. 9 to 11
9: Hull and walls of main cabin a corresponding to FIGS. 12 to 14
10: Hull and walls of main cabin a corresponding to FIGS. 12 to 14
11: Auxiliary engine
12: Front wheel axles 14
12': Back wheel axles 14'
12'': Intermediate wheels axles 14''
13: Axles support arm 12
13': Axles support arm 12'
13'': Axles support arm 12''
14: Front wheels
14': Back wheels
14'': Intermediate wheels
15, 15': Peripheric traction vanes in wheels
16: Aerodynamic rigid covering of wheels or windshield

DESCRIPTION OF THE PREFERRED EMBODIMENTS.

Generally speaking the reference aquatic vehicle is composed by a main cabin a formed by a hull with bottom part and side walls 1 (designs of FIGS. 1 to 4), walls 7 (FIGS. 5 to 7), walls 8 (FIGS. 9 to 11), walls 9 (FIGS. 12 to 14), or walls 10 (FIGS. 15 to 17), having the shape, design and size according to the type of vehicle etc, and being closed preferably by a roof having entrance or access doors to the interior 4, a windshield or driver's cabin 5 placed obviously at bow, a plurality of windows 2 for watching - in the case of passenger vehicle - having corresponding number of seats 3 according to the designs of FIGS. 1 and 3, 4 and 6, 8, 11 and 13, and 14 to 17. In fact, it should be clarified that no further details are given with respect to the shape of main cabin a design, compartments distribution, seats, holds, driver's cabin, and others as they are considered secondary characteristics to the purpose of this invention and they may be subject to numerous variations, according to the purpose, specific use, capacity, preference, etc.

It may be clarified that the main cabin a as well as in other aquatic vehicles, may be made out of metal, plastic, fiber glass, wood, etc, thus constituting a watertight structure with hermetic closures due obviously to its use and floatability conditions. Same as in long distance buses or airplane fuselages but not requiring pressurization, thus allowing the incorporation of windows for panoramic view.

In smaller vehicles or of the sporting or entertaining type, the main cabin a may not have roof or it may have a detachable one. As regards the main part, said cabin a is complemented by sets of wheels b -that may be three or more according to the size and use - which are relatively big and floating and serve as support to said main cabin a, maintaining it above water level N, or slightly submerged in same (according to the speed reached as hereinafter mentioned).

Figure 5:
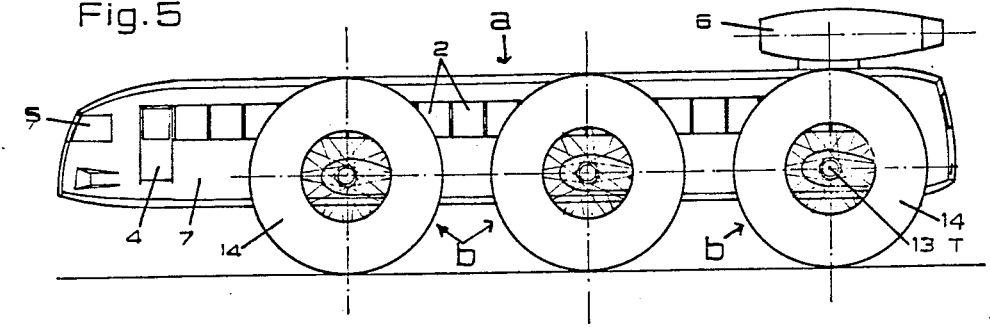
FIG. 5: a side view of a vehicle of a bigger size for transportation of a greater number of passenger, providing in this case, a set of intermediate floating wheels.
Figure 6:
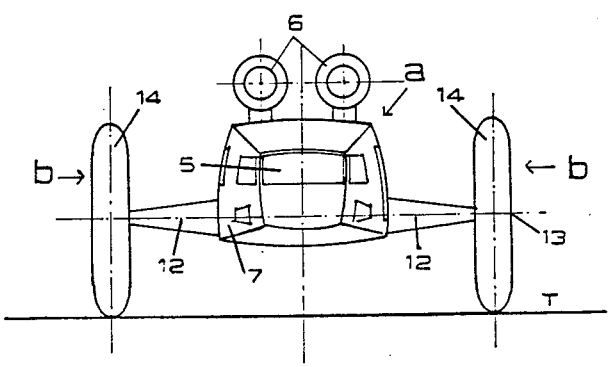
FIG. 6: an elevational front view of the bigger vehicle, according to design of FIG. 5, resting on the ground and provided -due to its size- with two turbines in the upper part.
Figure 7:
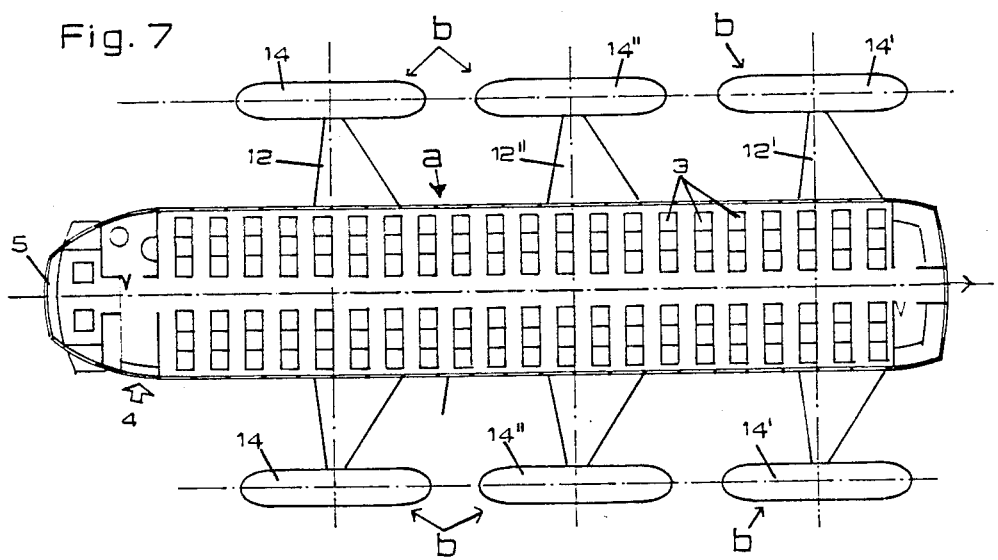
FIG. 7: a sectional horizontal longitudinal schematic plant view of the vehicle, similar to that in FIG. 4, this view corresponding to the bigger vehicle of FIGS. 5 and 6.

In the case of smaller vehicles, the sets of wheels may be two: front 14 and back 14' (FIGS. 1 to 4 and 9 to 17) while in the case of bigger or longer vehicles same may be supported by one or more sets of intermediate wheels 14'' (FIGS. 5 to 7).

The sets of wheels b are placed on both sides of the main cabin at a certain distance of it as from the front bearings 13, the back bearings 13', and the intermediiate bearings 13'', if any, which are respectively assembled on the axles 12, 12' and 12'', corresponding to the already mentioned front wheels 14, back wheels 14' and its intermediate wheels 14'', if any.

The wheels are hollow and made of light material; they have a rigid tire upon which an elastic cover is assembled constituting a pneumatic chamber with the particular property, in this case as beforementioned, that such chamber (14, 14′ or 14″ according to the wheel), is divided by inside partitions (e.g. radials) that conform elementary pneumatic chambers 17 (FIG. 2) each of which is in itself hermetic and watertight, and having pneumatic feeding valves either independently or combined to a common-to-all supply valve so as to facilitate inflation by only one beak.

Thus, as to already mentioned safety reasons, if one or more divisions of each wheel b are damaged, such wheel shall not loose its floatability condition. Likewise, and when necessary, allows the vehicle to travel on land T (FIGS. 4 and 5).

Figure 8:
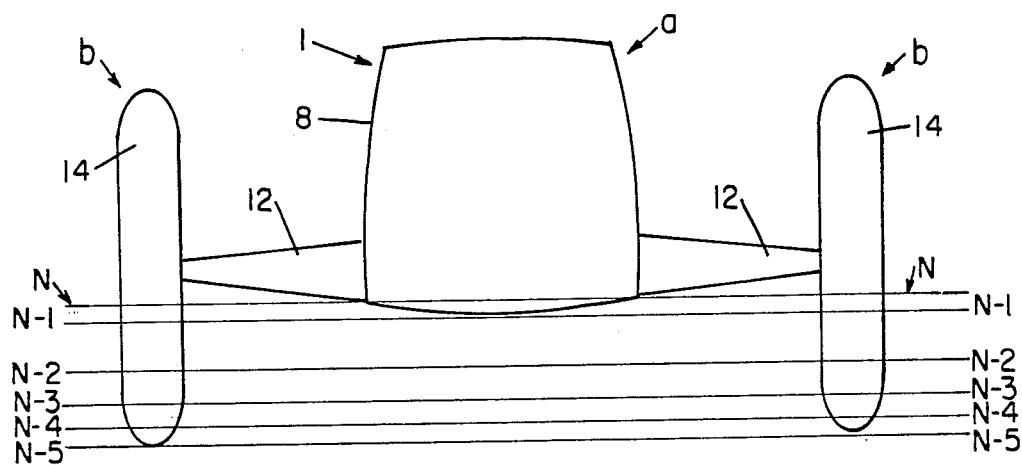
FIG. 8: a schematic front view of the vehicle showing the depth in water penetration variation, according to the speed reached, from the moment the vehicle is inoperative or in a still position, and up to high speed.

The pneumatic and floatability condition of wheels b apart from making them floating by themselves, support the main cabin a above the level N of the liquid medium along which it travels, or with its hull 1 submerged to depth N-4, N-3, N-2, and N-1 or N according to the speed reached, as well as adapt themselves to the different levels stated in FIG. 8, according to the speed reached between the stop position, freely floating (for loading and unloading purposes or non-working position) and speeds ranging from 60 k.p.h. to 200 k.p.h. or more.

In some cases, the supporting wheels b cause the main cabin a to emerge from level N when the vehicle exceeds aproximately 200 k.p.h.

Wheels b are of the necessary size, such that, when the vehicle is stopped, a section of their big hollow wheels 14, 14′ and eventually 14″ is submerged in a volume that is in relation to the total weight of the vehicle with all its crew and its maximum fuel load and which is calculated around one thousand kilogrames weight per cubic meter of volume of water to keep main cabin a above its level N.

The vehicle is driven by one, two or more turbines 6 according to the size of the vehicle that provide the necessary thrust to move the vehicle at very high speeds - with no precedent and unknown for any kind of ship or aquatic vehicle. As a consequence, a complete unknown phenomenon can be observed: the vehicle can move close to the water surface as if the latter were a solid surface and this is not a statement based just on imagination but a true statement responding to the physical laws related to inertia.

As beforementioned, the most outstanding operating characteristic of the new vehicle is that, unlike what happens to hulls of conventional ships, the water offers very little resistance to the forward movement, for its wheels b do not have to make way for themselves in the liquid - as happens in the already mentioned ships - as they roll over the liquid, pushing the water downward and, as speed increases, the insertion in the mass of water gradually decreases (FIG. 8). When the vehicle reaches a certain speed limit −200 k.p.h. aproximately- the water resists the insertion therein of wheels b, that is why they roll close to the surface N or on the crest of waves (not big), if any. However this vehicle is not fit to move at high speeds when the height of the waves overpasses a certain limit having to reduce, in such cases, speed and adapt its travelling to the movement and size of the waves.

With respect thereto, it must be mentioned that all composing elements have a certain vibration or oscillation frequency, so that when the frequency of the new aquatic vehicle is the same as the frequency obtained after going over one wave afteranother a "synchronization" or "resonance" phenomenon takes place that could damage the structure of the vehicle. Therefore, to prevent any damage, it is convenient that the vehicle have electronic elements capable of detecting such coincidence of frequencies beforehand and take the necessary steps to change speed, either reducing or increasing it.

Figure 18:
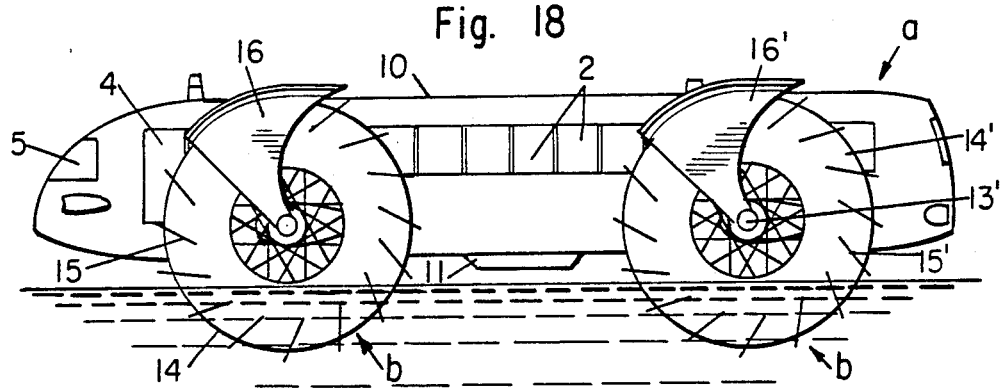
FIG. 18: a side view of an acquatic vehicle similar to FIGS. 1 and 2 but provided with an areodynamic covering of the wheels or windshield.
Figure 19:
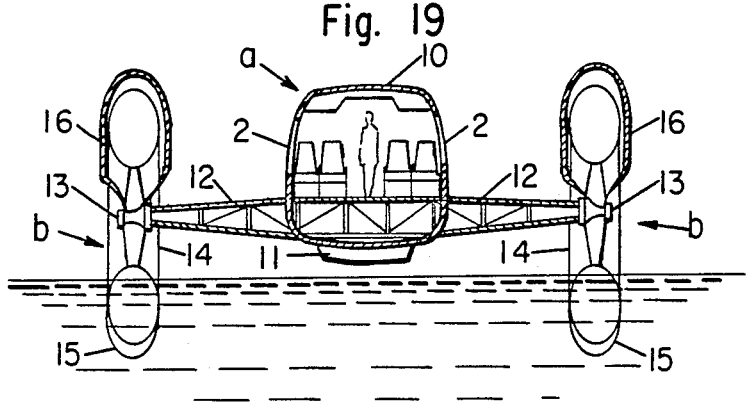
FIG. 19: a sectional transversal vertical view of the vehicle of FIG. 18.
Figure 20:
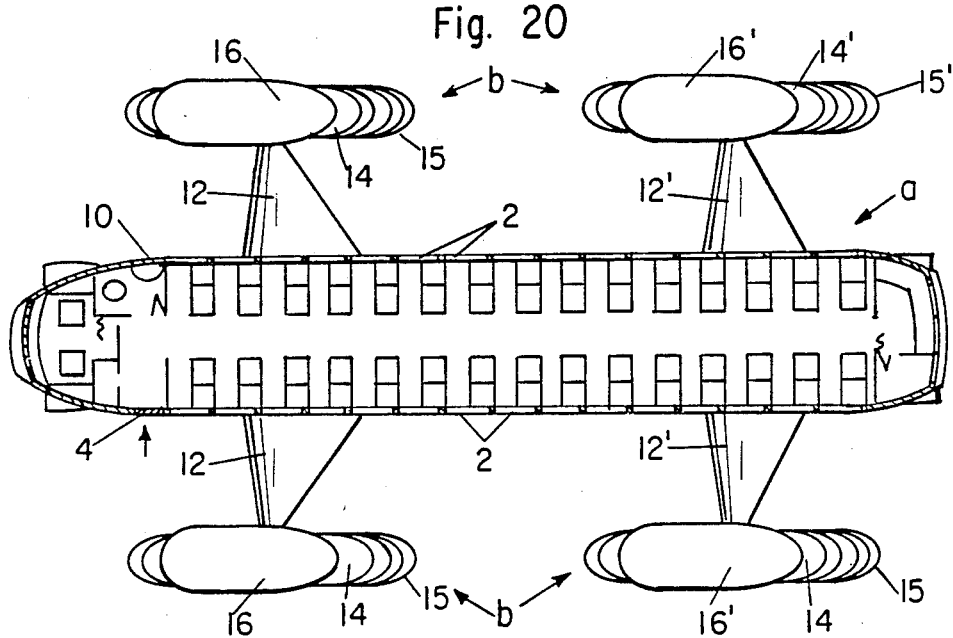
FIG. 20: a schematic sectional horizontal longitudinal view of the aquatic vehicle of FIGS. 18 and 19 illustrating a possible arrangement for seating of passengers.

As mentioned at the begining, the new vehicle has, apart from the turbine or turbines 6, an auxiliary engine such as an outboard motor 11 either in its lower or front part, which when lowered, goes into action to operate at low speed or to be used as an auxiliary engine in emergency cases (FIGS. 15 and 16). To secure a greater "grip" of wheels b to the water during their free turnings upon the corresponding axles, at least the back set 14′ of such wheels b or all of them have in the peripheral zone or their tread, several vanes 15, 15′ projected as shown in FIGS. 12 to 17. However, due to the great projection of wheels b outside water and in FIGS. 18 to 20, the presence of these vanes would have a great braking effect as a consequence of the rolling of the air or wind thoughout the forward movement, that is why the upper parts of wheels b -working as mudguards - go through the cavity of their respective aerodynamic rigid windshields 16.

Thus the "free" wheels or that rotate on their axles 12, 12′,12″ help the forward movement of the vehicle driven by the turbines or and/or the engine 11 as the case may be, supporting at the same time the main cabin a, which rises from the water level N without offering any resistance, or just very little during the forward movement.

In addition to this patent, and for turnings, this vehicle has a braking system in its front axles (not illustrated as it is a secondary characteristic) with a differential gear that operates independently in each of the wheels b of such axles. Turning occurs when the brake of the wheel on the side that one wants to turn to, is activated.

In a similar way, for braking, when going at high speeds the thrust of turbine 6 must be reduced thus, wheels b gradually sink into the water (FIG. 8), acting water as an effective brake. If at a distance there is an object whatsoever in its way, the vehicle may deviate its course or make the propellent means 11 operate in reverse, preferably having a radar, specially for night trips or when there is limited visibility.

With respect to the water splashing, side elements 12, 12′ and 12″ which support wheels 14,14′ and 14″ receive almost all the splashing due to their location as regards zone where wheels contact the water and due to the fact that they have an ample horizontal surface. When the vehicle goes at very high speed, this splashing does not occur as speed of wheels b is such that inertia allows no time for such water particles to move.

This new vehicle is specially suitable for operating in relatively short distances, i.e. across the River Plate, in big lakes as the Superior, Hudson and other lakes of the U.S. of America, and Canada; in the Mediterranean Sea, Caspian Sea, North Sea, Caribbean Sea, Pacific Islands, coastal trips, etc.

It can be built to carry different passengers capacity, being those of greater capacity the ones that offer better performance -as in the case of aircrafts - , it can have six, eight or more floating wheels b and capacity for 300 persons or more. It can also be designed with holds for transportation of cargo. No doubt that modifications to certain construction details and shape of the new aquatic vehicle of present invention can bemade when put into practice and without this implying any parting of the basic principles that are clearly stated in the following claims:

After having described and determined the nature of the present invention and the way to put it into practice, the exclusive right and property thereof is claimed:

1. An aquatic vehicle for transporting passengers at high speeds over water, comprising:
   an elongated body having a cabin to accommodate the passengers;
   means for sustaining said body above the water, said sustaining means including freely rotatable wheels and axles, said axles projecting from said body to said wheels, said wheels having inflated tires with oval cross-sections;
   means for maintaining floatability even after a portion of said tires becomes damaged, said maintaining means including a plurality of partitions extending in said tires radially outward relative to said axles so as to form a plurality of hermetically sealed and watertight chambers; and
   means for propelling said body independently of said wheels at a speed so that said wheels roll on top of a surface of the water rather than penetrate the surface of the water, said wheels being free of any transmission means from said propelling means.

2. A vehicle as defined in claim 1, wherein said propelling means includes at least one turbine.

3. A vehicle as defined in claim 2; and further comprising:
   an outboard motor for carrying out slow runs for tying up and untying at wharves and for emergencies arising from a failure of said propelling means; and
   means for raising and lowering said motor relative to said body.

4. A vehicle as defined in claim 2, wherein said turbine is formed as a turbopropeller turbine.

5. A vehicle as defined in claim 2, wherein said turbine is formed as a reaction tubine.

6. A vehicle as defined in claim 1; further comprising:
   means for driving said wheels through said axles, said driving means being arranged in a bottom portion of said cabin; and
   means for pulling said body, said pulling means including a plurality of fins arranged radially on a perimeter of said wheels.

7. A vehicle as defined in claim 1, wherein said sustaining means includes four wheels; further comprising:
   means for driving two of said wheels through one of said axles; and
   means for pulling said body, said pulling means including a plurality of fins arranged radially on a perimeter of said two wheels.

8. A vehicle as defined in claim 1, wherein said sustaining means includes at least six wheels, said propelling means including at least two turbines propelling said body independent of said wheels, said cabin being formed to accommodate at least 300 passengers therein.

9. A vehicle as defined in claim 7; further comprising:
   means for shielding said two wheels against wind, said shielding means including guards enclosing an upper portion of said two wheels, said sustaining means having at least two additional wheels, said additional wheels being free of guards.

10. A vehicle as defined in claim 1; further comprising:
    windows in said body; and
    an access door leading to said cabin.

11. a vehicle as defined in claim 1, wherein said propelling means is formed to propel said body at 200 k.p.h. over water at which speed said wheels roll on top of the surface of the water.

12. An aquatic vehicle for transporting passengers at high speeds over water, comprising:
    an elongated body having an enclosed cabin;
    means for sustaining said body over water, said sustaining means including freely rotatable wheels and axles, said axles projecting from said body to said wheels, said wheels having inflatable tires with oval cross-sections;
    means for maintaining floatability even when a portion of said tires becomes damaged, said maintaining means including partitions in said tires extending radially outward from said axles so as to form hermetically sealed and watertight chambers; and
    means for propelling said body independently of said wheels at a speed of at least 200 k.p.h. so that the wheels roll on top of a surface of the water rather than penetrate the surface of the water, said propelling means including a turbine, said wheels being free of any transmission means from said propelling means;
    means for pulling said body for slow runs and during failure of said propelling means, said pulling means including fins extending radially outward on a perimeter of two of said wheels, said pulling means also including drive means for driving said two wheels; and
    means for shielding said two wheels against wind, said shielding means including guards enclosing an upper portion of said two wheels.

13. A method of transporting passengers at high speed over water, comprising:
    sustaining an elongated body above water by freely rotatable wheels and axles, the axles projecting from the body to the wheels, the wheels having tires;
    maintaining floatability even when a portion of the tires becomes damaged, the maintaining including forming hermetically sealed and watertight chambers in the tires by extending partitions radially outward in the tires from the axles; and
    propelling the body over water independently of the wheels at a speed so that the wheels roll on top of a surface of the water rather than penetrate the water.

14. A method as defined in claim 13, wherein the propelling includes propelling the body at a speed of at least 200 k.p.h. at which speed the wheels roll on top of the surface of the water.

* * * * *